Jan. 24, 1961    L. D. STATHAM    2,968,943
TRANSDUCER
Filed Oct. 29, 1956    4 Sheets-Sheet 1

INVENTOR.
LOUIS D. STATHAM
BY
*Philip Subkow*
ATTORNEY

Jan. 24, 1961

L. D. STATHAM
TRANSDUCER 2,968,943

Filed Oct. 29, 1956

INVENTOR.
LOUIS D. STATHAM
BY
ATTORNEY

Jan. 24, 1961

L. D. STATHAM 2,968,943

TRANSDUCER

Filed Oct. 29, 1956

INVENTOR.
LOUIS D. STATHAM
BY
*Philip Subkow*
ATTORNEY

Jan. 24, 1961  L. D. STATHAM  2,968,943
TRANSDUCER
Filed Oct. 29, 1956  4 Sheets-Sheet 4
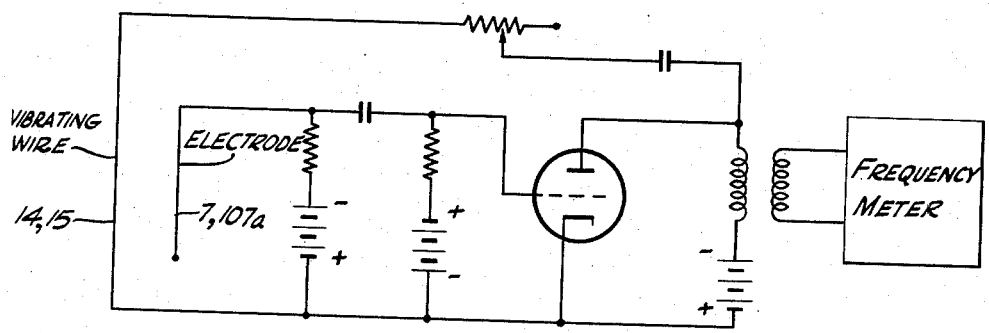
FIG. 16.
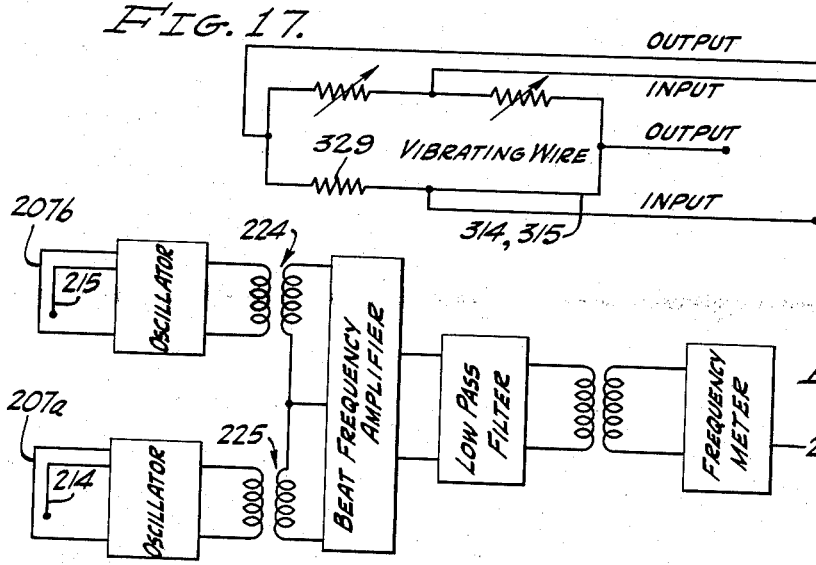
FIG. 17.
FIG. 18.
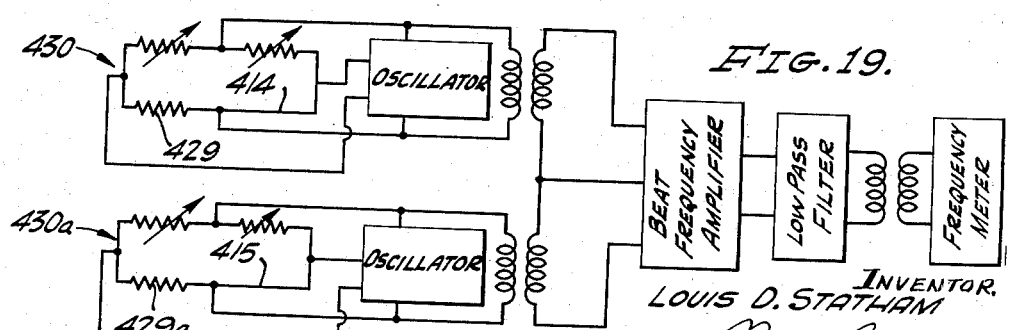
FIG. 19.
INVENTOR.
LOUIS D. STATHAM
By Philip Subkow
ATTORNEY.

United States Patent Office 2,968,943
Patented Jan. 24, 1961

2,968,943

TRANSDUCER

Louis D. Statham, Beverly Hills, Calif., assignor to Statham Instruments, Inc., a corporation of California Filed Oct. 29, 1956, Ser. No. 619,052

21 Claims. (Cl. 73—141)

This application relates to an improvement in strain wire transducers and constitutes a continuation-in-part of application Serial No. 604,976, filed August 20, 1956, now Patent No. 2,858,400, and application Serial No. 605,098, filed August 20, 1956, which in turn are each a continuation-in-part of application Serial No. 502,663, now Patent No. 2,760,037.

This invention relates to an improvement in transducers in which the magnitude of a force or displacement causes a variation in tension in a filament to change its natural frequency of vibration and the measure of the vibrational frequency is correlated with the degree of tension on the filament, and therefore may be used as a measure of the force or displacement imposed on the filament.

Such transducers are known in the prior art and reference may be had to U.S. Letters Patent No. 2,447,817, and No. 2,689,943, for descriptions of two forms of such transducers.

In both of these forms the gage length of the transducers varies with temperature as the case or frame on which the vibrating wire varies as the case or frame is heated or cooled. Since this charge varies the tension in the vibrating wire when no force or displacement is applied to the transducer, the variation in temperature may cause a zero shift, i.e., a variation in the frequency of vibration of the filament under no load conditions and introduces an inaccuracy into the system, depending on the relative degree of expansion of the wire and case.

The gage of my invention, as described more fully below, solves this difficulty in that the gage is so designed that its effective gage length is made small and may be made to be substantially zero and variations in temperature resulting in expansion or contraction of the gage or filament have but an insubstantial effect on the gage length of this instrument. Such a gage will have little or no zero shift with temperature.

I accomplish this result by connecting two wires each to a spring and stretching these wires under tension to two points preferably separated by a small difference to make an acute angle to each other and displace the point at which the wires are attached relative to the other two points of attachment so that one of the wires is increased in tension while the other of the wires is decreased in tension. This relative motion may be the result of the application of a force or displacement and the resulting variations in tension may be made the measure of this force or displacement. In order to report this variation in tension in one or the other of these wires or in both, these wires may be made the vibrating wire of an oscillatory system, such as for example those of the patents previously referred to.

Additionally, the gage has a multiplying factor which may be up to substantially a value of two, built into the gage, so that the change in frequency measured by the measuring circuit may be up to twice the change in the natural frequency of the filaments resulting from the change in tension in the filament occurring as a consequence of the displacement or force causing such change.

Thus I may accomplish these results by connecting the vibrating filament to a force summing means which applies the force or displacement, and to a spring and connects a like filament to the spring and to a fixed point adjacent the point of connection of the first wire to the force summing means. These filaments are desirably suitably electrically conductive.

I may, however, attach the two wires each to the force summing means, such that the displacement of the force summing means may cause a movement of these two points of attachment relative to each other.

Alternatively, I may so connect the two wires each to a fixed point and connect the spring to the force summing means in such manner that the displacement of the force summing means moves the point of attachment of the wires to the spring relative to the fixed points of attachment of each of the wires.

In each such case one of the wires increases in tension while the other wire decreases in tension on movement of the force summing means.

In one form of my invention, one or the other, or both wires, are live, i.e., may be connected in an oscillatory electrical circuit, and such wire is positioned in a constant magnetic field while the other wire has no potential difference applied to it, i.e., is electrically neutral. In another form of my invention each wire may be connected in separate oscillatory circuits and each are live wires, both wires positioned in the magnetic field. In the former case the frequency of the circuit required to maintain the live wire in sustained vibration and the variation in frequency resulting from the movement of the force summing means is a measure of the variation tension in the wire. In the latter case each live wire is subjected to a substantially equal variation in tension and the arithmetic sum of the variation in frequencies may be measured as a measure of the tension in each wire. In the latter case the change in the measured frequency occurring upon any given variation in tension is twice that which would occur in the former case, the wires being the same and of equal length in both cases, equally tensioned and the variation in tension being likewise equal but of opposite sign, i.e., in one decreasing while in the other increasing.

These and further objects of my invention will be described by reference to the drawings, of which:

Figs. 16 through 19 are wiring diagrams of the forms illustrated on Figs. 1 through 15.

Figure 2:
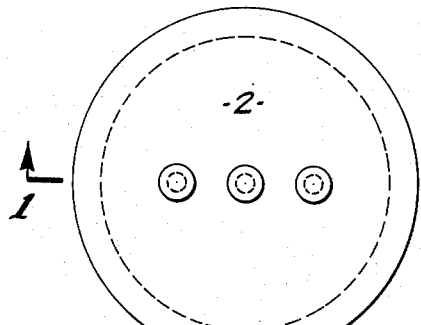
Fig. 2 is a top view of Fig. 1.
Figure 3:
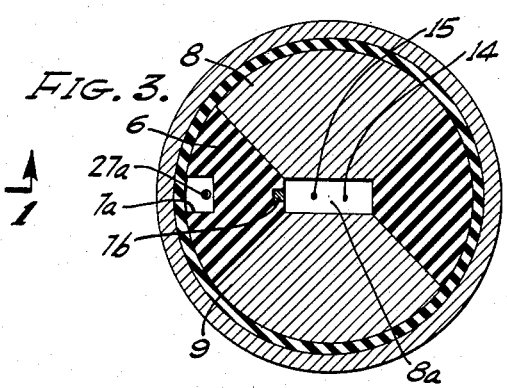
Fig. 3 is a section on line 3—3 of Fig. 1.
Figure 1:
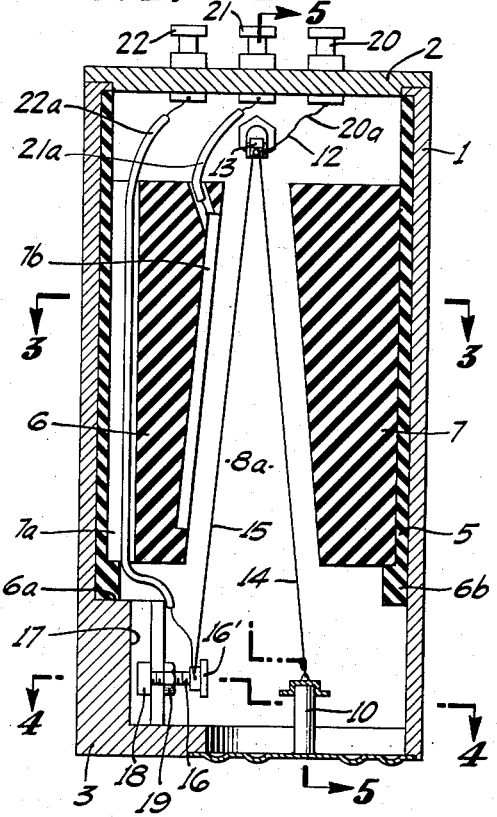
Fig. 1 is a vertical section through one form of my invention taken on line 1—1 of Fig. 2.
Figure 5:
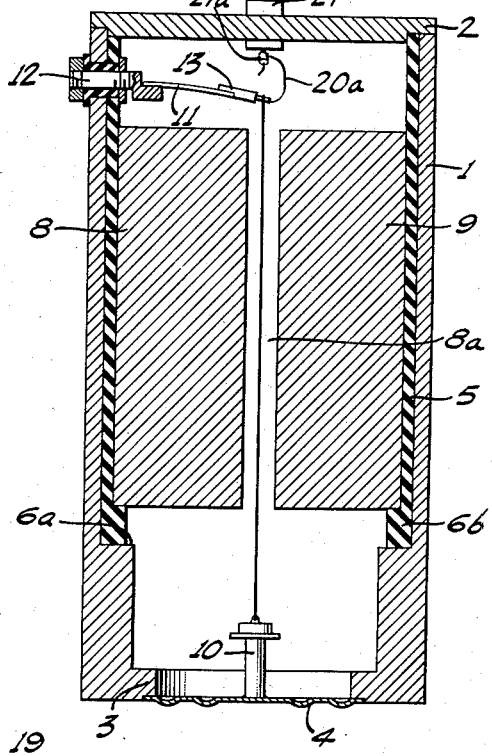
Fig. 5 is a section on line 5—5 of Fig. 1.

In Fig. 1, case 1 carries cover plate 2, a base 3 in which is welded the diaphragm 4; an insulating non-magnetic sleeve 5 having an internal shoulder is seated on shoulder 6a of the case 1. The sleeve 5 is formed with a shoulder 6b onto which is set the trapezoidal wedge-shaped electrically insulating non-magnetic wedges 6 and 7 between which is set the trapezoidal permanent magnets 8 and 9 so oriented that their north and south poles oppose each other across a central square opening 8a formed by the contiguous faces of the trapezoids. The wedge 6 carries a channel 7a formed adjacent the wall of the sleeve 5.

A spring 11 is carried on a support 12 positioned at the upper end of the sleeve 5, and electrically insulated from the case 1. The spring is a flat light spring and carries a metallic pin 13. The wires 14 and 15 are metallic and suitably non-magnetic, such as the platinum alloy (92% platinum, 8% tungsten) wires, for example, such as used in electrical resistance strain gages, or tungsten or any other suitable metal, and may be welded or soldered to the pin 13 mounted on the flat spring 11. The wires are stretched in the desired degree of tension and 14 is rigidly affixed by welding or soldering to a metallic cap positioned on the insulating pin 10 centrally rigidly attached to the diaphragm 4. Another like wire 15 is stretched in like tension between pin 13 and a metallic cap 16' insulated from the threaded pin 16 which carries a T-head 18 sliding into slot 17 and held in position by nut 19. The wires 14 and 15 are thus insulated from the case. The electrode 7b positioned in the insulation 6 extends parallel to and substantially the length of the wire 15. Preferably the wire and electrode are so positioned so that a plane passed therethrough is perpendicular to the substantially uniform permanent magnetic field in 8a.

A light slack electrical conduit 20a electrically connects one end of the wire 15 to the terminal 20. An electrical conduit 21a electrically connects the electrode 7b to the terminal 21 and the electrical conduit 22a electrically connects terminal 22 to the other wire 15, all electrical leads other than wires 14 and 15 being suitably insulated. The wire 14 is thus electrically isolated from the terminals 21 and 22, which are insulated from the case.

The terminals 20, 21 and 22 may be connected in an oscillatory circuit with a suitable feedback so the frequency of the oscillating circuit is controlled by the natural frequency of vibration of the wire 15, and suitable means for determining the frequency of oscillation and therefore the natural frequency of the wire may be provided. Such a circuit is shown in Fig. 16. Such circuitry and the means for measuring the frequency when so adjusted, is old in the art and is shown in U.S. Patent No. 2,447,817 and need not be further described.

Any movement of the diaphragm 4 causes a change in tension in the wire 14 and in the tension in wire 15 which change is the direction opposite to the change in tension in 14. Thus, if the wire 14 relaxes in tension the wire 15 increases in tension, spring 11 receding to compensate therefor. The difference in the magnitude of the tension in 14 and 15 is a function of the ratio of the spring rate of the spring 11 to that of the wires, both wires having the same spring rate. As appears more fully described in Patent No. 2,760,037, the change in tension in the wire 14 will be related to that in the wire 15 as is represented by the following expression:

$$dl_1 = dl_3 = \frac{k_1 dl_2}{k_2 + k_1}$$

where $dl_1$ and $dl_2$ are the changes in strain in the wires 14 and 15, respectively, and $dl_3$ is the displacement of the pin 13, and $k_1$ is the spring rate of the wires and $k_2$ is the spring rate of the spring. By making the spring rate of the spring very small the change in tension in wire 15 may be made substantially equal to that of the wire 14. Thus, by making spring rate of the spring from .1 to .001 times that of the wires the change in tension in wire 15 will be from 90.9 to 99.9% of that in wire 14, or any other ratio as desired.

It will be observed that if the points of attachment of the wire 15 at 16 and of the wire 14 to 10 are substantially in the same plane that a line drawn through 13 will be perpendicular to the line connecting these points of attachment and will make equal angles with 14 and 15.

This means that the wires are of equal length and the gage length of the gage is substantially zero, and thus temperature changes will cause little or no zero shaft. A change in temperature which expands or contracts the case will cause an insubstantial change in the tension in the wires. The degree of variation in length of the wires which does occur, because of such expansion or contraction, will be but a small fraction of the expansion or contraction of the case, because of the compliance of the spring, as will be understood from the foregoing. This results in an improved stability of the zero with regard to temperature changes, i.e., the setting of the instrument with the diaphragm undeflected.

Another result of the construction is that any load imposed on one of the wires by the force summing means, such as the diaphragm 4, to decrease the tension in one of the wires, resulting in an increase in tension in the other wire, may proceed until one of the wires is entirely relaxed. Since both of the wires are stretched in their initial rest position such that the sum of the tensions is set at any safe maximum limit of tension in the wires for which the instrument is designed to develop, the total tension imposed on a wire, when the other is completely relaxed, will not be greater than this designed maximum tension. Consequently, for example, when pin 13 has moved sufficiently to develop this maximum tension in wire 15, the further displacement of the force summing diaphragm 14 will result in a movement of the pin 13 and the increase in strain in the wire will be but a small fraction of the displacement of the force summing means, as will appear from the foregoing. Thus, the present device will reduce and practically eliminate the danger of overloading the wires to cause either breaking or permanent deformation, i.e, exceeding the maximum design limit of tension, due to imposition of an overload or excessive displacement on the force summing means.

While I prefer to employ the wires so that they are equally tensioned in their original no load setting, it is possible with some sacrifice of range of application of force to the force summing means or displacement of the force summing means to distribute the maximum safe tension load unequally between the wires.

Figure 6:
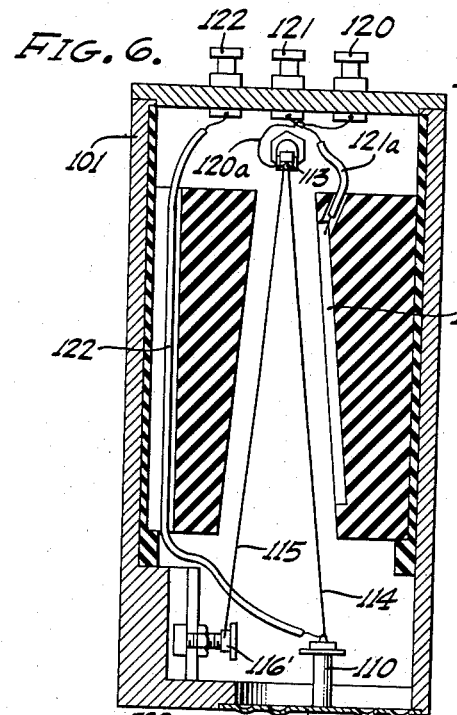
Fig. 6 is a vertical section of another form of my device.

The form shown in Fig. 6 is the same as that shown in Fig. 1 except that the vibrating wire 114 (15 in Fig. 1) is the one connected to the diaphragm 104, the electrode 107a (corresponding to 7 in Fig. 1 is positioned opposite to wire 114 and parallel to it, similarly to the form shown in Fig. 1. Wires 114 and 115 are electrically and rigidly connected to pin 113. Wire 115 is rigidly connected to metallic cap 116' insulated from the threaded pin, similarly to the connection of wire 15 in Fig. 1. The wire 114 is rigidly connected to a cap on insulating post 110. The pin 113 is mounted on the spring which is mounted in case 101 in the same manner as 13 in Fig. 1. The lower end of wire 114 is electrically connected by conduit 122a to terminal 122. Pin 113 is similarly connected to terminal 120 by conduit 120a and electrode 107a is similarly connected by conduit 121a to terminal 121, all terminals being insulated from the case 101. In all other respects the units of Fig. 1 and Fig. 6 are the same. Terminals 120, 121 and 122 correspond to terminals 20, 21 and 22 of Fig. 1 and are similarly connected to the oscillatory circuit shown in Fig. 16. The devices function similarly.

Figure 7:
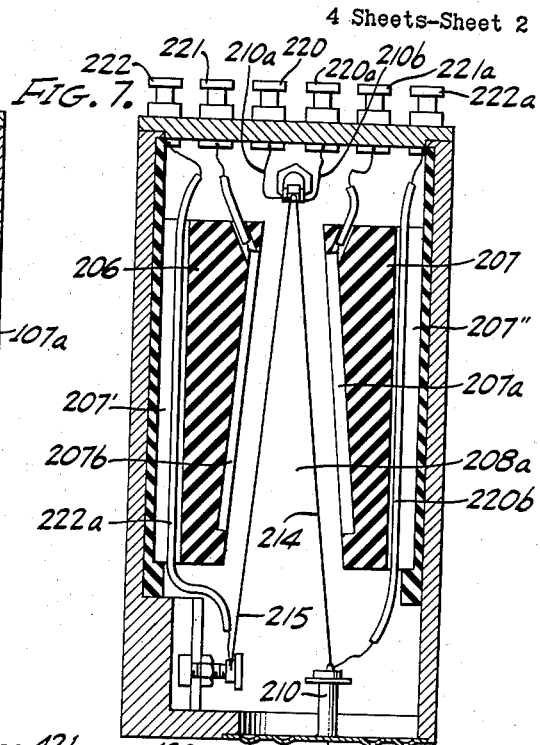
Fig. 7 is a vertical section of another form of my device.

Fig. 7 shows a form similar to the forms of Fig. 1 and Fig. 6 but combining both forms, by providing electrodes 207a and 207b each opposite and parallel to each of the wires 214 and 215, as shown in Fig. 7. A groove 207' similar to 7a in Fig. 1 is provided in one trapezoidal insulating wedge 206, and a like groove 207" is provided in the opposite trapezoidal wedge 207. Electrical conduit 222a extends through the slot 207' and electrically connects the lower end to wire 215, which is insulated from the case as in the previous forms, to the terminal 222, and the electrical conduit 220b extends through slot 207" and electrically connects the lower end of wire 214, which is connected to the cap of the insulating pin 210 as in the previous forms, to the terminals 222a. The pin 13 (see Fig. 10) is not metallic as in the forms 1 and 6 but is of insulating material and rigidly connected to the flat spring 211 mounted as in Figs. 1 and 6. The pin 13 carries two wing separators 213' and 213" of the same material as 13 and has rigidly connected thereto, two spaced semicylindrical metallic shells 213a and 213b, to which the wires 214 and 215 may be rigidly and electrically connected as by soldering. Slack electrical leads 210a connect wire 215 to terminal 220 and like lead connects wire 214 to terminal 220a. The electrode 207a is electrically connected to the terminal 221a and the electrode 207b is electrically connected to the terminal 221. Preferably each of the wires and their cooperating electrodes are oriented in a plane perpendicular to the lines of force of the magnetic field in the slot 208a. The two independent vibrator wires 214 and 215 are electrically isolated from the case and each other and are connected in two independent oscillating circuits (see Fig. 18) each for example of the form circuits shown in Fig. 16. The outputs 224 and 225 from each circuit are fed to a beat frequency amplifier and then through a low pass filter which passes the frequency equal to the difference between the frequencies of the oscillators connected to wire 214 and that connected to wire 215, and this frequency may be measured by a frequency meter.

With both wires of equal characteristics and equally tensioned, the frequency adjusted in the two oscillators to the equal natural frequencies of the two vibrating wires no frequency will be measured by the frequency meter 228. Should, however, the diaphragm be deflected and a substantially equal and opposite change in tension occurring in the two wires, the frequency meter will record twice the change in frequency in each of the wires. For example, assume the natural frequency of each of the wires to be 7000 cycles per second with wires under original tension such that the change in tension is in the substantially linear portion of the function relating tension to vibrational frequency. Assume now that a change in pressure against diaphragm causes a decrease in tension in wire 214 equal to a change in the natural frequency of the wire of 500 cycles per second, i.e., a reduction from 7000 cycles to 6500 cycles per second. In like manner the reduction in tension will be transferred to wire 215 to increase its tension a substantially like amount and thus increase the natural frequency from 7000 to 7500 cycles per second. The beat frequency amplifier will thus beat to a frequency of 7500±6500 cycles per second. With the wave filter set to cut off frequencies above the difference between the two frequencies, i.e., to cut off frequencies above 1000 cycles per second, the meter will report a frequency of 1000 cycles per second. In like circumstances in the form of Fig. 1 and Fig. 6 a like change, for like wires, of like length and tension the frequency change reported would be only 500 cycles per second. The device of Fig. 7 thus doubles the sensitivity of the instrument.

Instead of using the variable capacity effect of a vibrating wire in combination said fixed electrode as shown in the forms of Figs. 1–7, I may omit the electrodes entirely and employ the vibrating wire as an active arm of an electrical bridge.

Figure 8:
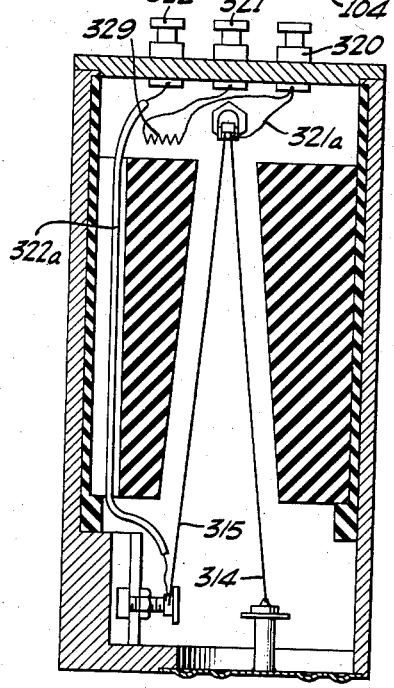
Fig. 8 is a vertical section of another form of my device.

This is illustrated in Fig. 8 in which the construction is substantially identical to that of Fig. 1 except that the electrode 7 and its electrical connection is omitted. While as shown the wire 315, corresponding to wire 15 in Fig. 1, is the vibrating wire, and wire 314 corresponding to wire 14 is electrically isolated in the same manner as is wire 14 in the form of Fig. 1, I may use the wire 314 as the vibrating wire, making the electrical connections and electrically isolating wire 315 in the same manner as is shown for the electrical connections for wires 14 and 15 respectively, in the form shown in Fig. 6. In Fig. 8 I have illustrated this form with the vibrating wire as 315. Thus the vibrating wire is connected to terminal 320 by lead 321a and to terminal 322 by lead 322a. I also provide a balancing resistance 329 positioned in the case and of resistance equal to that of the vibrating wire and electrically connecting the resistance to the vibrating wire and terminal 320 and to terminal 321. Wire 329 and the vibrating wire are connected in a bridge arrangement. The output of the bridge is connected in an oscillating circuit and the output of the oscillator is connected to a frequency measuring circuit. This circuiting forms no part of this invention. Such a circuit having a similar purpose is described in U.S. Patent No. 2,689,943 and need not be further described. A schematic diagram of this bridge is shown in Fig. 17 (see also Fig. 19).

With the wire static, the bridge is balanced and no output is obtained from the network. If the bridge is energized by input frequency equal to the natural frequency of the vibrating wire the wire is set in vibration and the bridge becomes unbalanced. The output of the bridge resulting from the resulting bridge unbalance will be at the frequency of the input to the bridge and may be measured to give the natural frequency of the vibrating wire. The change in frequency of the output of the bridge will thus be a measure of changes in tension in the wire resulting from the displacement of the diaphragm.

When employing wires whose electrical resistance changes with tension, the displacement of the diaphragm will cause a bridge unbalance due to such change in electrical resistance. This degree of unbalance is however a second order effect compared with the unbalance resulting from the generated counter-electromotive force of the vibrating wire and will not materially affect the functioning of the device. This is especially true for the small resistance changes occurring in such transducers and particularly so for wires of low gage factors, such as for example tungsten wires.

Figure 9:
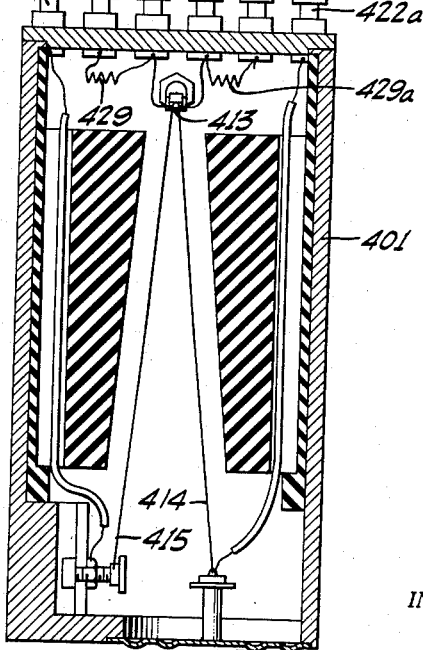
Fig. 9 is a vertical section of another form of my device.

Fig. 9 shows a variation of the system shown in Fig. 8. The wires 415 and 414 are connected to pin 413 in the same manner as the wires 214 and 215 are connected to pin 213 in Figs. 7 and 10. Wire 415 is connected at the pin end to terminal 420 and at the other end to termnal 422. The balancing resistance 429 mounted in case 401 is connected between terminal 421 and 420. Wire 414 is connected at one end to terminal 422a and at the pin end to terminal 420a. The balancing resistance 429a, also mounted in case 401, is connected between terminal 420a and terminal 421a. Thus two independent bridges 430 and 430a are provided, as is shown schematically in Fig. 19, each fed by a separate oscillator and the output of each oscillator fed to a beat frequency oscillator whose output is fed through a low pass filter to cut off frequency higher than to the difference between the frequencies of the output of the two bridge oscillators and to pass the frequency equal to such difference, and this frequency is measured by a frequency meter.

In Figs. 1–10, one end of each of the wires is connected to a spring and the other end of one of the wires is connected to a fixed point, and the other end of the other wire is attached to the force summing means, illustrated by the diaphragm in the figures.

Figure 10:
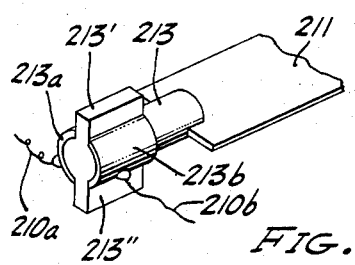
Fig. 10 is a perspective of a fragmentary detail employed in my invention.
Figure 4:
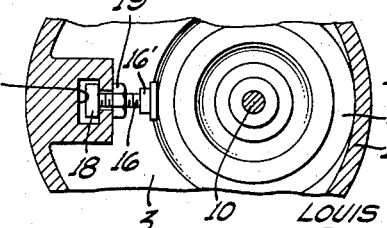
Fig. 4 is a fragmentary section on line 4—4 of Fig. 1.
Figure 11:
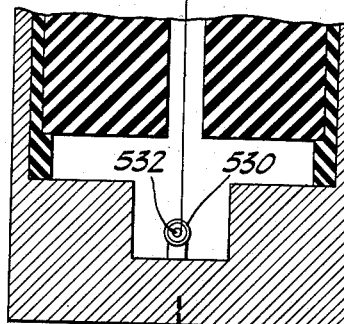
Fig. 11 is a fragmentary section of another form of my device.
Figure 12:
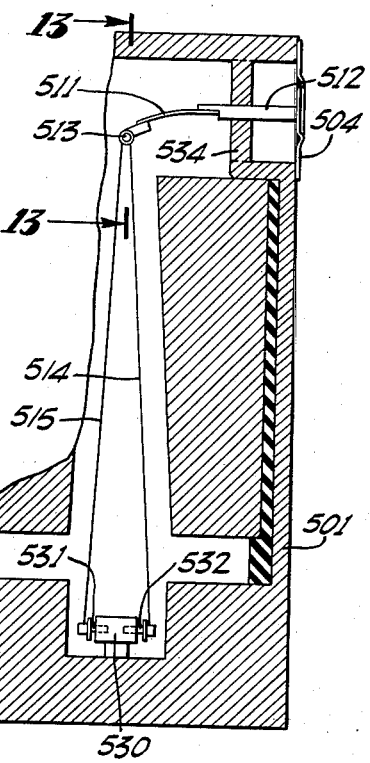
Fig. 12 is a fragmentary section taken on line 12—12 of Fig. 11.

In the form shown in Fig. 11, wires 514 and 515, corresponding to wires 14 and 15 (Fig. 1), 114 and 115 (Fig. 6), 214 and 215 (Fig. 7), 314 and 315 (Fig. 8), and 414 and 415 (Fig. 9), are each connected to a metallic cap on an insulating pin 531 and 532 rigidly fixed to the case 501 in a bracket 530. The other ends of each of the wires are connected to pin 513 on spring 511 constructed either in the form of Fig. 1 or in the form of Fig. 10, depending on whether the circuit of Figs. 16, 17, 18 or 19 is used, as will be clear from the foregoing. The spring 511 is connected to a rod 512 centrally and rigidly connected to diaphragm 504. The rod is guided in spider 534. The axis pin 513, with the diaphragm in the neutral no load position is on the bisector of the acute angle between the wires 514 and 515.

The spring, while flexible to move to or from the pins 531, is rigid in the plane of the spring so that on displacement of the diaphragm 504, the pin moves to or from the pins 531 and 532 to increase the tension in one of the wires and decrease the tension in the other of the wires.

Figure 14:
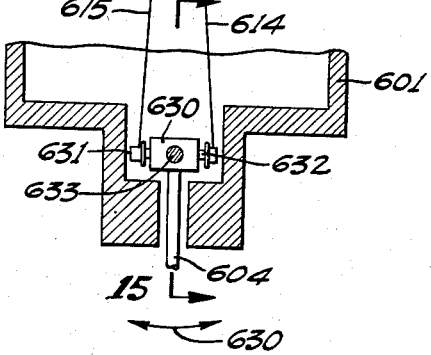
Fig. 14 is a fragmentary section of another form of my device.
Figure 13:
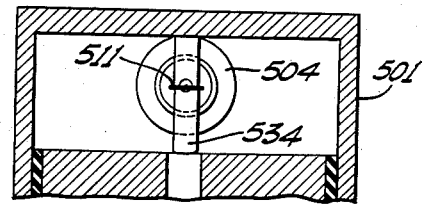
Fig. 13 is a fragmentary section taken on line 13—13 of Fig. 12.
Figure 15:
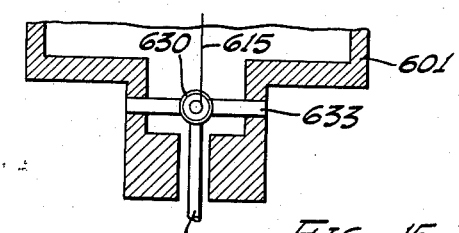
Fig. 15 is a section taken on line 15—15 of Fig. 14.

I may, as shown in Figs. 14 and 15, connect both ends of both the wires to a force summing means, the other ends of the two wires being connected to a spring, as in the forms of Figs. 1 to 10. The connection to the force summing means being of a form to cause a movement of all points of attachment of the wires, relative to each other to cause, on displacement of the force summing means, a reduction in tension in one of the wires and an increase in tension of the other of the pair of wires.

As illustrated in Figs. 14 and 15, the force summing means is a rod 604 extending through the base of the instrument and is connected to a lever 630 pivoted in pivot 633 supported in the base. The wires 614 and 615, corresponding to wires 14 and 15 of Fig. 1, 114 and 115 of Fig. 6, 214 and 215 of Fig. 7, 314 and 315 of Fig. 8, 415 and 416 of Fig. 9, depending on the circuitry employed, are rigidly and electrically connected to pins 631 and 632. The other ends of the wires are connected to the spring, as shown in the form of Fig. 1 or Fig. 10, depending on the above circuitry. The remaining construction of the device of Figs. 14 and 15 is the same as employed in the other forms, as will be clear from the foregoing.

It will be seen that on movement of the rod 604 in the directions of the arrows the lever 630 will rock to cause one of the wires to increase in tension while the other decreases in tension.

In all the forms illustrated the distribution of original tension and the variations in tension and their consequence is as described in connection with Fig. 1 and the measurement of the variation in tension will be as described in connection with the circuits shown in Figs. 16 to 19, inclusive, depending on which is employed.

While I have described a particular embodiment of my invention for the purpose of illustration, it should be understood that various modifications and adaptations thereof may be made within the spirit of the invention as set forth in the appended claims.

I claim:

1. A transducer, comprising a frame, a pair of tensioned metallic wires, a movable force summing means, a first support for a first one of said tensioned wires, a motion transmitting connection between said force summing means and said support, a second support connected to the first one of said tensioned wires, a yieldable constraining means connected to said second support and to said frame, another of said tensioned wires connected to said second support and a third support for said second tensioned member, one of the tensioned wires connected to and extending in tension between the first and second supports and the second of said tensioned wires connected to and extending in tension between the second and third support, means for displacing at least one of said first and third supports to relatively vary the spacing of the first and third support relative to the second support on movement of said force summing means, whereby one of said tensioned wires increases in tension while the other of said tensioned members decreases in tension on said displacement of said force summing means, and magnetic means positioned adjacent one of said wires to establish a magnetic field transverse to said wire whereby an oscillating motion may be produced in said last named wire and an electrical signal may be derived from said last named wire at a frequency related to the natural frequency of said last named wire.

2. A transducer according to claim 1 in which the spring constant of the constraining means is from about .1 to about .001 times the spring constant of the tensioned wires.

3. A transducer according to claim 2 in which the sum of the tensions in the tensioned wires is less than the ultimate tensile stress of the tensioned wires.

4. A transducer according to claim 1 in which the sum of the tensions in the tensioned wires is less than the ultimate tensile stress of the tensioned wires.

5. A transducer according to claim 1, including a supply circuit to impress an electrical signal on one of said wires at a frequency related to the natural frequency of said wire, and means for determining the frequency of said signal.

6. A transducer according to claim 5 in which the spring constant of the constraining means is from about .1 to about .001 times the spring constant of the tensioned wires.

7. A transducer according to claim 6 in which the sum of the tensions in the tensioned wires is less than the ultimate tensile stress of the tensioned wires.

8. In combination with the transducer according to claim 1, an electrical circuit including said last named wire and means in said electrical circuit for obtaining an electrical output signal related to the natural frequency of said last named wire.

9. A transducer according to claim 8 in which the spring constant of said constraining means is from 0.1 to 0.001 times the spring constant of said tensioned wires.

10. A transducer according to claim 8 in which said electrical circuit comprises an electrical bridge including said last named wire.

11. A transducer according to claim 10 in which the spring constant of said constraining means is from 0.1 to 0.001 times the spring constant of said tensioned wires.

12. A transducer, comprising a frame, a pair of tensioned metallic wires, a movable force summing means, a first support for a first one of said tensioned wires, a motion transmitting connection between said force summing means and said support, a second support connected to the first one of said tensioned wires, a yieldable constraining means connected to said second support and to said frame, another of said tensioned wires connected to said second support and a third support for said second tensioned member, one of the tensioned wires connected to and extending in tension between the first and second supports and the second of said tensioned wires connected to and extending in tension between the second and third support, means for displacing at least one of said first and third supports to relatively vary the spacing of the first and third support relative to the second support on movement of said force summing means, whereby one of said tensioned wires increases in tension while the other of said tensioned members decreases in tension on said displacement of said force summing means, and magnetic means positioned adjacent both of said wires to establish a magnetic field transverse to each of said wires whereby an oscillating motion may be produced in each of said wires and an electrical signal may be derived from said wires at a frequency related to the natural frequencies of said wires.

13. A transducer according to claim 12 in which the spring constant of the constraining means is from about .1 to about .001 times the spring constant of the tensioned wires.

14. A transducer according to claim 13 in which the sum of the tensions in the tensioned wires is less than the ultimate tensile stress of the tensioned wires.

15. A transducer according to claim 12, including electrical circuits to impress a signal to each of the wires at a frequency related to the natural frequency of each of said wires, and means for determining the difference in frequency of said signals.

16. A transducer according to claim 15 in which the spring constant of the constraining means is from about .1 to about .001 times the spring constant of the tensioned wires.

17. A transducer according to claim 16 in which the sum of the tensions in the tensioned wires is less than the ultimate tensile stress of the tensioned wires.

18. In combination with the transducer according to claim 12, an electrical circuit including said last named wire and means in said electrical circuit for obtaining an electrical output signal related to the natural frequency of said last named wire, a second electrical circuit including the other of said wires and means in said second electrical circuit for obtaining an electrical output signal related to the natural frequency of said other wire.

19. A transducer according to claim 18 in which the spring constant of said constraining means is from 0.1 to 0.001 times the spring constant of said tensioned wires.

20. A transducer according to claim 18 said first named circuit is a bridge including said last named wire and said second electrical circuit is a bridge including said other wire.

21. A transducer according to claim 20 in which the spring constant of said constraining means is from 0.1 to 0.001 times the spring constant of said tensioned wires.

References Cited in the file of this patent

UNITED STATES PATENTS

| | | |
|---|---|---|
| 1,995,305 | Hayes | Mar. 26, 1935 |
| 2,306,137 | Pabst et al. | Dec. 22, 1942 |
| 2,447,817 | Rieber | Aug. 24, 1948 |
| 2,522,117 | Holt et al. | Sept. 12, 1950 |
| 2,613,536 | Jakosky | Oct. 14, 1952 |
| 2,689,943 | Rieber | Sept. 21, 1954 |
| 2,760,037 | Statham | Aug. 21, 1956 |